United States Patent Office 2,813,243
Patented Nov. 12, 1957

2,813,243
RECTIFIER SYSTEM

Carl A. Christian, Monroeville, and Slavo J. Murcek, White Oak, Pa., assignors to Westinghouse Electric Corporation, East Pittsburgh, Pa., a corporation of Pennsylvania Application July 12, 1956, Serial No. 597,442

11 Claims. (Cl. 321—12)

The present invention relates to a rectifier system and more particularly to the operation of a single alarm or rectifier shutdown relay from a potential existing by reason of the failure of any one or more individual rectifier units of a bank of rectifiers which normally supplies large current to a load.

Rectifier systems used to supply large currents consist of a plurality of rectifier units connected in parallel in either single-phase or polyphase systems. The failure of one or more rectifiers in such a polyphase or multiple rectifier and the consequent blowing of its fuse will divert the current carried by it to the remaining rectifiers, thus resulting in excessive current being carried by the remaining rectifiers. This results in a greatly shortened life of the remaining rectifier units and ultimately in their failure. In order to prevent the failure of the entire rectifier bank, some suitable indicating means is necessary in order that the bank may be disconnected from the power source and replacement of the faulty rectifier be made. In the past, such indicating means have consisted of a lamp or other visual indicator for each individual rectifier unit. It is apparent that such indicating means are not satisfactory where, frequently, the banks consist of 40 or more rectifier units and where one person may be inspecting a great number of these banks. Since the indicator at each individual unit under these conditions can be observed only at infrequent intervals, much damage and long interruption of service can take place between observation of the individual rectifier units.

The principal object of the present invention is to provide for the operation of a single detecting means upon the failure of any one or more rectifier units in a rectifier bank.

A further object of the invention is to provide a rectifier system which includes a single relay operable to disconnect a rectifier bank from its power source upon the failure of one or more rectifier units.

Another object of the invention is to provide a rectifier system which includes a single relay to disconnect the rectifier bank from its power source, a visible signal or an audible signal, or any combination thereof, all operable upon the failure of one or more rectifier units.

A more specific object of the invention is to provide a rectifier system which includes a single alarm or shutdown means common to all rectifier unit legs or paths, which is isolated from the individual rectifier unit legs or path by the insertion of an auxiliary rectifier element in each leg or path and which alarm or shutdown means is operable by the potential existing by reason of the loss of a rectifier leg or path.

The invention will be more fully understood from the following detailed description, taken in connection with the accompanying drawings, in which.

Figure 1:
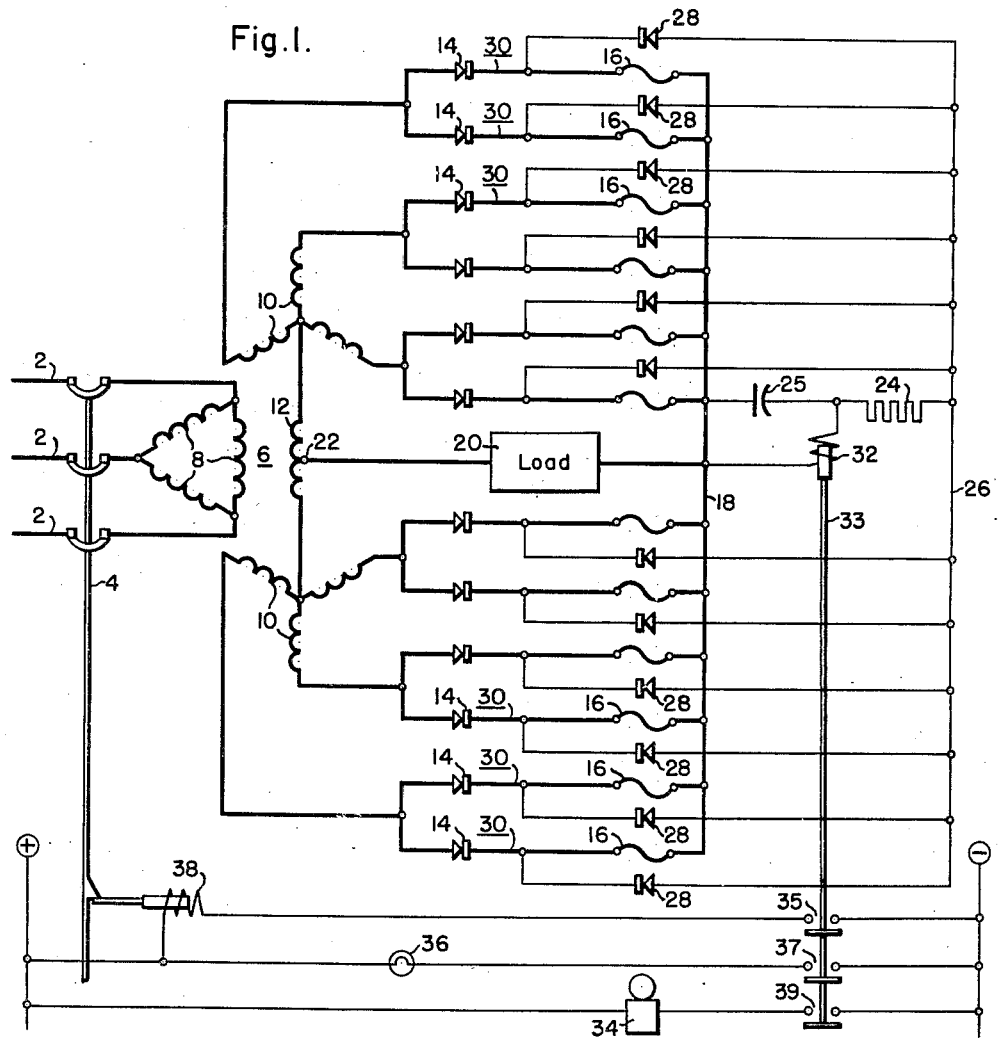
Figure 1 is a schematic wiring diagram showing the arrangement and construction of a polyphase rectifier system embodying the present invention.

The rectifier system shown in Fig. 1 is supplied from a three-phase alternating-current line 2 which may, if desired, include a circuit breaker 4 of any suitable type. The circuit breaker 4 is shown as having a trip coil 38 for effecting opening of the breaker 4 and may be actuated to closed position manually or by any suitable means. The rectifier system as shown in Fig. 1 is connected to the three-phase line 2 by means of a transformer 6 to reduce the voltage to a suitable value to give the desired direct-current output voltage. The transformer primary 8 is delta connected in the three-phase line. The transformer secondaries 10 are double Y-connected to an interphase transformer 12. Such a double Y-connected rectifier consists of two, three-phase half-wave rectifiers operating in parallel. The interphase transformer 12 connects the neutrals of the transformer secondaries 10 and is simply an inductor which serves to isolate the two half-wave rectifiers. The rectifier system operates effectively as a six-phase rectifier. Connected to each phase of the transformer secondary are a plurality of rectifier units 14 which may be of the semiconductor type such as silicon or germanium rectifiers. It will be understood that the rectifier units 14 may be of any other suitable type. The rectifier units 14 are connected with their anode sides adjacent the transformer secondaries 10. In series with each rectifier unit 14 and at the cathode side is a fuse 16. The fuse side of the rectifiers are connected together to a common load bus 18. A direct-current load 20 is connected between the midpoint 22 of the interphase transformer 12 and the load bus 18. A relay coil 32 of relay 33 is connected to the load bus 18 and to a common alarm bus 26 through a resistor 24.

An isolating rectifier 28, which may be a low voltage, low current type such as a selenium or germanium diode, is connected at its cathode side to each path 30 of the rectifier system 3 at a point between the power rectifier unit 14 and its associated fuse 16 and at its anode side to the common alarm bus 26. A capacitor 25 is connected across the relay coil 32 of relay 33. Since the fault potential applied to relay coil 32 is essentially a single-phase pulse and inasmuch as for practical reasons the relay coil 32 must draw relatively little current, being a direct-current relay, capacitor 25 and resistance 24 have been added as filtering elements to complete the circuit essentials.

Capacitor 25 is effectively charged by the potential appearing across relay coil 32 and this charging current is limited by the resistor 24, protecting the small isolating rectifier unit 28. Therefore, the relay 32 tends to remain closed on the opposite alternation by reason of the charge on the capacitor 25.

It is to be especially noted that in the embodiment above described, the isolating rectifiers 28 are connected in opposition to the power rectifier itself comprising rectifier units 14. It can be seen from Fig. 1 that the rectifier system 3 passes the positive alternations of the current delivered by the alternating-current power source to the load 20, each of the individual rectifier unit paths 30 being protected by an individual fuse 16. Since the fuse 16 is effectively in parallel with the relay coil 6 in series with the isolating rectifier 28, only negligible potential appears across the relay coil 32 under normal conditions. If, however, one or more of the rectifier units 14 becomes short circuited for any reason, its associated fuse 16 blows or opens and a potential equal to the rectifier positive resistance drop and the blocked negative supply alternation appears across the fuse terminals, However, inasmuch as the isolating rectifier 28 is connected in opposition to the power rectifier elements 14, the positive potential drop is effectively blocked and does not appear across the relay coil. Inasmuch as the fuse 16 is open and the negative alternation of the supply potential appears across the fuse terminals, no potential being apparent across the load 20 at this time, the potential due to the negative alternation of the supply potential appears across the relay coil 32, causing operation of the relay 33. Thus, if the rectifier side of the supply source 2 is instantaneously negative, current flows from the source through the defective power rectifier unit 14, through the isolating rectifier 28, through the relay coil 32, and through the load 20 and back to its source. On the positive alternation of the supply potential from source 2, current flows from the load terminal of the source to the load 20, through the fuse and rectifier elements of the remaining rectifier paths, and thus back to the source, the current due to the small potential drop appearing across the power rectifier units 14 being effectively blocked from flowing through the relay coil 32 by reason of the isolating rectifier 28. Contacts 35, 37, 39 of relay 33 are connected in the control circuit of the trip coil 38, a buzzer 34 and a lamp 36, respectively, so that when the relay 33 closes its contact, the trip coil 38 is energized and the circuit breaker 4 opens to disconnect the rectifier bank from the line. In addition the buzzer 34 operates and the lamp 36 lights. It will be apparent that any one or two of these indicators 34 and 36 may be omitted.

Figure 2:
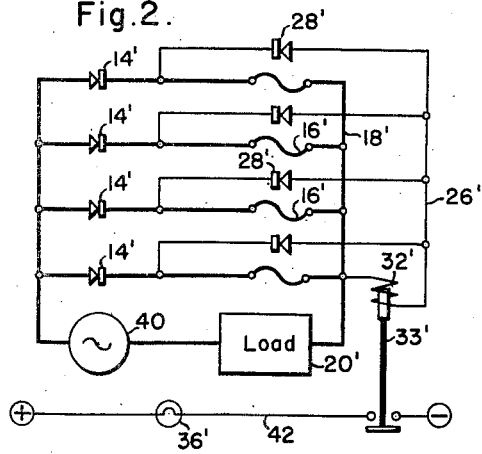
Fig. 2 is a schematic diagram showing an embodiment of the invention in a single-phase system.

A similar embodiment of the invention is shown in Fig. 2, wherein a single-phase source 40 of alternating current is supplied through a plurality of power rectifier units 14' connected in parallel to a load 20'. As in the embodiment shown in Fig. 1, a fuse 16' is connected in series with each of the individual rectifier units 14'. An isolating rectifier 28' is connected in opposition to each power rectifier unit 14', one end of the isolating rectifier 28' being connected between the fuse 16' and the power rectifier unit 14' and the other end of each isolating rectifier being connected to a common alarm bus 26'. The relay coil 32' is connected at one end to the common alarm bus 26' and at the other end to a load bus 18' of the rectifier bank. In Fig. 2, the relay 33' normally open, is operable to close a lamp circuit 42. It will be understood that the relay may operate a circuit breaker trip coil to disconnect the rectifier bank from the alternating-current source or to operate a buzzer. A lamp or buzzer may be connected directly to the common alarm bus 26 at one side and to the load bus 18' of the rectifier bank 16' at the other side in lieu of the relay coil 32'. The operation of this embodiment is the same as the Fig. 1 embodiment. The circuit shown in Fig. 3 is the same as the circuit shown in Fig. 2, except that isolating rectifier 28' is connected in reverse fashion as compared with isolating rectifier 28' in Fig. 2.

Figure 3:
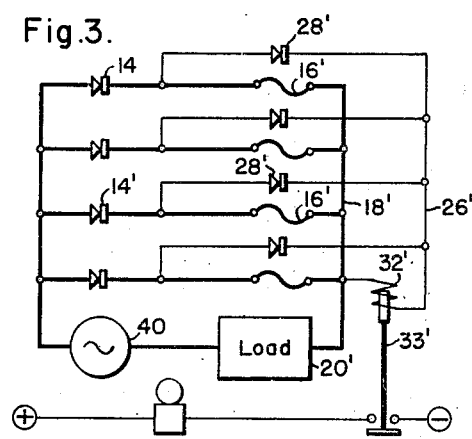
Fig. 3 is a schematic diagram similar to Fig. 2, but illustrating a modified embodiment of the invention.

In the embodiment shown in Fig. 3, the loss of a leg or path again results in the opening of its associated fuse 16. However, in this embodiment the power rectifier blocked negative alternation is also blocked away from the relay coil and the relay coil 32' operates solely by reason of the conducted positive alternation through the power rectifier 14' and the auxiliary element 28' upon opening of the fuse 16' of that particular power rectifier.

Thus it can be seen that a means has been provided for indicating a failure of one or more rectifier units of a rectifier bank comprising a plurality of units. This may be accomplished with a single relay or other indicating device regardless of the number of rectifier units present in the system or the number of phases in the rectifier system. The indicating means is effectively isolated from the circuit under normal operating conditions. The operation of this rectifier phase leg failure monitor is independent of the type of power rectifiers that are used. The buzzer and lamp have been shown as having their contact connected in auxiliary control circuits but it may be possible in some cases to have these indicating devices connected directly in the common alarm circuit.

It is to be understood that although certain specific embodiments of the invention have been shown and described for the purpose of illustration, the invention is not limited to these specific arrangements but it will be apparent that other embodiments and modifications are possible and are within the scope of the invention.

We claim as our invention:

1. In a rectifier system comprising a plurality of power rectifier units connected in parallel forming a rectifier bank, an individual fuse in series with each power rectifier unit, a common alarm bus connected to one side of said bank, a circuit responsive to the voltage across said individual fuses; said circuit comprising a plurality of isolating rectifiers, each of said isolating rectifiers being connected at one side to a point intermediate one of said power rectifier units and its corresponding fuse and at its other side to said common alarm bus, and means responsive to current flow in said common alarm bus.

2. In a rectifier system as in claim 1, wherein said means responsive to current flow in said common alarm bus comprises a relay operable to disconnect said rectifier bank from the power source.

3. In a rectifier system as in claim 1, wherein said means responsive to current flow in said common alarm bus comprises an indicator lamp.

4. In a rectifier system as in claim 1, wherein said means responsive to current flow in said common alarm bus comprises a buzzer.

5. In a rectifier system as in claim 1, wherein said means responsive to current flow in said common alarm bus comprises a relay operable to disconnect said rectifier bank from the power source, a lamp and a buzzer.

6. An indicator system for a star-connected polyphase rectifier bank, said bank comprising, a plurality of rectifier units connected in parallel in each phase leg, an individual fuse in series with each of said rectifier units connected between said rectifier units and a load bus, a circuit responsive to the voltage across said individual fuses; said circuit comprising a common alarm bus, a plurality of isolating rectifiers, each of said isolating rectifiers connected at one side to a point intermediate one of said rectifier units and its corresponding fuse, and at its other side to said common alarm bus, and relay means responsive to current flow in said common alarm bus.

7. An indicator system for a star-connected polyphase rectifier bank, said bank comprising a plurality of rectifier units connected in parallel in each phase leg, an individual fuse in series with each of said rectifier units connected between said rectifier units and a load bus, a circuit responsive to the voltage across said individual fuses; said circuit comprising a common alarm bus, a plurality of isolating rectifiers, each of said isolating rectifiers connected at one side to a point intermediate one of said rectifier units and its corresponding fuse and in opposition to said rectifier units and at its other side to said common alarm bus, and relay means responsive to current flow in said common alarm bus.

8. In a rectifier system comprising a plurality of power rectifier units connected in parallel forming a rectifier bank, an individual fuse in series with each of said power rectifier units, a common alarm bus connected on one end to the cathode side of said bank, a circuit responsive to the voltage across said individual fuses; said circuit comprising a plurality of isolating rectifiers, each of said isolating rectifiers connected at its cathode side to a point intermediate one of said power rectifier units and its corresponding fuse, and at the anode side of said power rectifier units to said common alarm bus, and means responsive to current flow in said common alarm bus.

9. In a rectifier system comprising a plurality of power rectifier units connected in parallel forming a rectifier bank, an individual fuse in series with each of said power rectifier units between said rectifier units and a neutral conductor, a common alarm bus connected on one end to the cathode side of said bank, a circuit responsive to the voltage across said individual fuses; said circuit comprising a plurality of isolating rectifiers, each of said isolating rectifiers connected at its anode side to a point intermediate one of said power rectifier units and its corresponding fuse, and at the cathode side of said isolating rectifier to said common alarm bus, and means responsive to current flow in said common alarm bus.

10. In a rectifier system comprising a plurality of rectifier units connected in parallel, common means for detecting a failure in any single one of said rectifier units and means for isolating said detecting means from the rectifier circuit under normal operating conditions.

11. An indicator system for a double star-connected, polyphase rectifier bank, said bank comprising a plurality of rectifier units connected in parallel in each phase leg, means for detecting a failure in any single one of said rectifier units and means for isolating said detecting means from the rectifier circuit under normal operating conditions.

References Cited in the file of this patent

UNITED STATES PATENTS

| | | |
|---|---|---|
| 1,899,594 | Simon | Feb. 28, 1933 |
| 2,023,166 | Dallenbach | Dec. 3, 1935 |
| 2,057,531 | Livingston | Oct. 13, 1936 |